(12) United States Patent
Teshima et al.

(10) Patent No.: US 7,388,473 B2
(45) Date of Patent: Jun. 17, 2008

(54) CONTROL SYSTEM AND METHOD USING BIOMETRIC INFORMATION

(75) Inventors: Kentaro Teshima, Kariya (JP); Kazuhiro Nakashima, Kariya (JP); Takeshi Kumazaki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 390 days.

(21) Appl. No.: 11/159,148

(22) Filed: Jun. 23, 2005

(65) Prior Publication Data

US 2006/0055509 A1    Mar. 16, 2006

(30) Foreign Application Priority Data

Sep. 10, 2004   (JP)   ............... 2004-264122

(51) Int. Cl.
*B60R 25/10*   (2006.01)
(52) U.S. Cl. ............... 340/426.17; 340/5.82; 340/5.72; 340/825.69; 307/10.2; 180/287
(58) Field of Classification Search ............... 340/5.72, 340/539.23, 5.83, 5.52
See application file for complete search history.

(56) References Cited

U.S. PATENT DOCUMENTS 6,891,467 B2 *   5/2005   Perttunen et al. ...... 340/426.17

| 2002/0080256 | A1* | 6/2002 | Bates et al. | 348/335 |
| 2002/0118865 | A1* | 8/2002 | Hosokawa | 382/124 |
| 2004/0027237 | A1* | 2/2004 | Magner et al. | 340/5.54 |
| 2004/0041690 | A1* | 3/2004 | Yamagishi | 340/5.52 |

FOREIGN PATENT DOCUMENTS

JP    A-2000-352245    12/2000

* cited by examiner

*Primary Examiner*—Brian Zimmerman
*Assistant Examiner*—John Lambert
(74) *Attorney, Agent, or Firm*—Posz Law Group, PLC

(57) ABSTRACT

An entry control system includes a portable device carried by a vehicle user and a biometric sensor attached to a vehicle door. The biometric sensor includes a CCD camera and a shutter. The shutter is moved to uncover the CCD camera only when the portable device is validated. After the biometric sensor detects the biometric information based on a finger print image of the user, the shutter is moved again to cover the CCD camera. Each time the shutter moves, a brush cleans the CCD camera. The vehicle door is enabled to be opened only when the user is validated based on the biometric information.

8 Claims, 4 Drawing Sheets

US 7,388,473 B2

CONTROL SYSTEM AND METHOD USING BIOMETRIC INFORMATION

CROSS REFERENCE TO RELATED APPLICATION

This application is based on and incorporates herein by reference Japanese patent application No. 2004-264122 filed on Sep. 10, 2004.

FIELD OF THE INVENTION

The present invention relates to a control system and method, which validate a user based on biometric information.

BACKGROUND OF THE INVENTION

Various remote control systems are now in use. In one system such as a smart entry system, a portable device (electronic key) carried by a vehicle user transmits a response signal in return to an interrogatory signal periodically transmitted from a vehicle. This response signal includes identification information therein. If the portable device is validated based on the identification information, vehicle doors are unlocked and a vehicle engine starting is enabled. This system is, however, disadvantageous in that the doors may be unlocked and the engine may be started even if the portable device is used by an unauthorized vehicle user.

JP 2000-352245A proposes another system, which validates a vehicle user based on biometric information such as a finger print, a voice print or a face picture of the vehicle user in addition to identification information of a portable device. This system thus restricts vehicle door unlocking and engine starting by an unauthorized user.

In this system using biometric information, a CCD sensor may be used to optically detect the finger print, the face picture or the like. It is necessary to expose a light inlet opening of the CCD sensor. The surface of a glass in the light inlet opening is subjected to dust or the like. The surface of the glass will be stained or blurred, particularly when the finger or a part of a user body is required to touch the glass for biometric detection. This causes poor detection of the biometric information of the user.

SUMMARY OF THE INVENTION

It is therefore an object of the present invention to provide a control system and method, which ensures satisfactory detection of biometric information for validating a user.

According to the present invention, a biometric device is provided on a door of an object such as a vehicle. The biometric device is normally held disabled to be exposed to light so that the biometric device is protected from being stained. Only when the user is detected as approaching the door, the biometric device is enabled to be exposed to the light thereby to detect biometric information of the user. The door is enabled to be opened by the user only when the user is validated based on the biometric information detected by the biometric device. The biometric device is disabled again to be exposed to the light.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
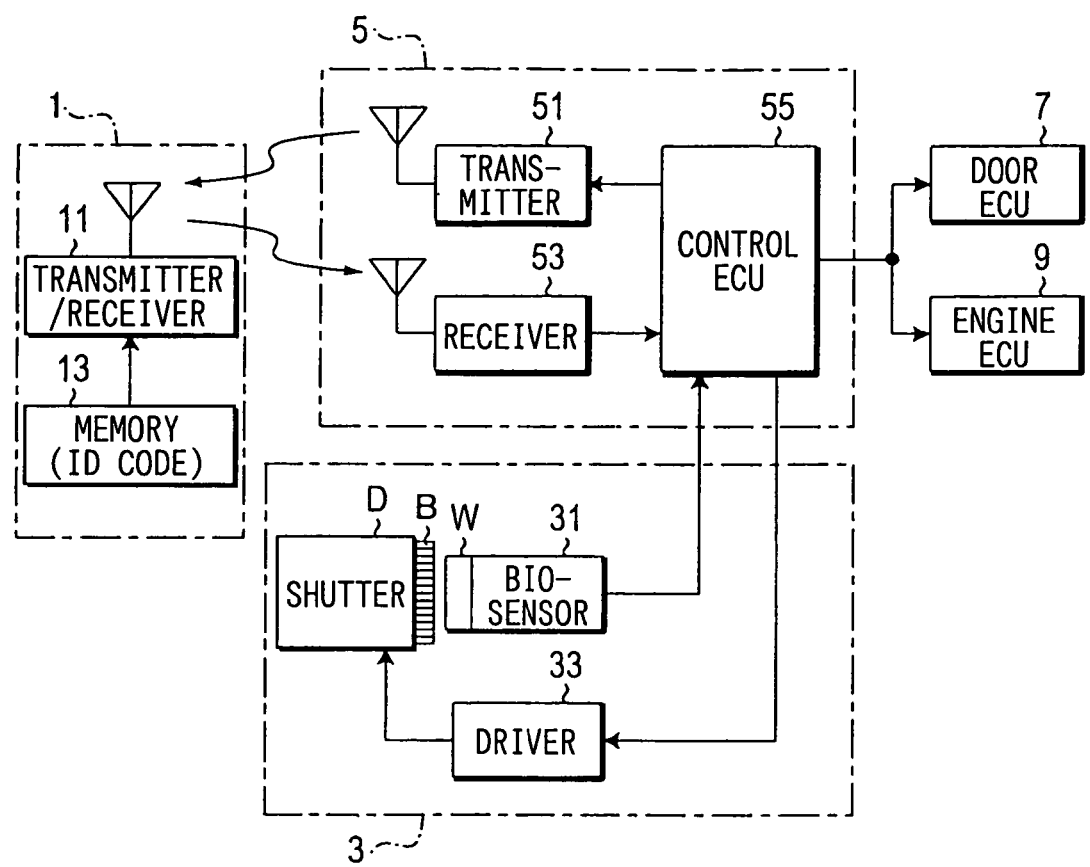
FIG. 1 is a block diagram showing a control system according to an embodiment of the present invention.

Referring to FIG. 1, a control system is applied to a vehicle as a smart entry system. The control system includes a portable device (electronic key) carried by a vehicle user, a sensor device 3 provided on a driver-side door to optically detect biometric information of the user and a vehicle-mounted control device 5 for controlling an electronic control unit for a vehicle door (door ECU) 7 and an electronic control unit for a vehicle engine (engine ECU) 9. The sensor device 3 may detect a finger print of the user as the biometric information of the user. The control device 5 receives identification information (ID code) from the portable device 1 through radio communication and receives the biometric information from the sensor device 3 to check whether the user is an authorized person. The control device 5 outputs a door control command and an engine control command to the ECUs 7 and 9, respectively, if the user is validated as the authorized person.

The door ECU 7 may be provided for each door and drives the door to an unlocking standby condition when the door control command from the control device 5 is an unlocking permission command. The door ECU 7 thereafter automatically unlocks the door when the user touches a switch (not shown) provided on a door handle.

The engine ECU 9 drives the engine to a starting standby condition when the engine control command from the control device 5 is a starting permission command. The engine ECU 9 thereafter starts the engine when the user operates a switch (not shown) provided near a steering wheel.

The sensor unit 3 includes a biometric sensor 31 for optically detecting the biometric information of the user and a driver circuit 33 for moving a shutter D with a cleaning brush B to open or close a light inlet opening (transparent glass window) W of the biometric sensor 31.

As shown in FIGS. 2A to 3B, the biometric sensor 31 has a sensing part 31a such as a CCD camera and an image processing part 31b for processing a picture image taken by the sensing part 31a to extract biometric information from the image. The biometric sensor 31 is provided in a casing K having an opening H and positioned beneath the opening H. This opening H is larger in diameter than that of the light inlet opening W attached to the sensing part 31a so that the light inlet opening W is exposed to the outside of the casing K. The opening (glass) W may be an object lens.

Figure 2A:
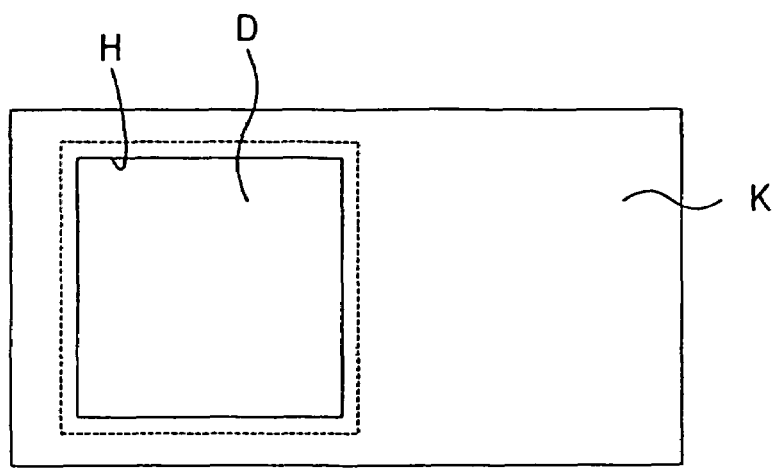
FIGS. 2A and 2B are a plan view and a sectional view showing a biometric sensor used in the control system shown in FIG. 1 in its window-closing condition.
Figure 2B:
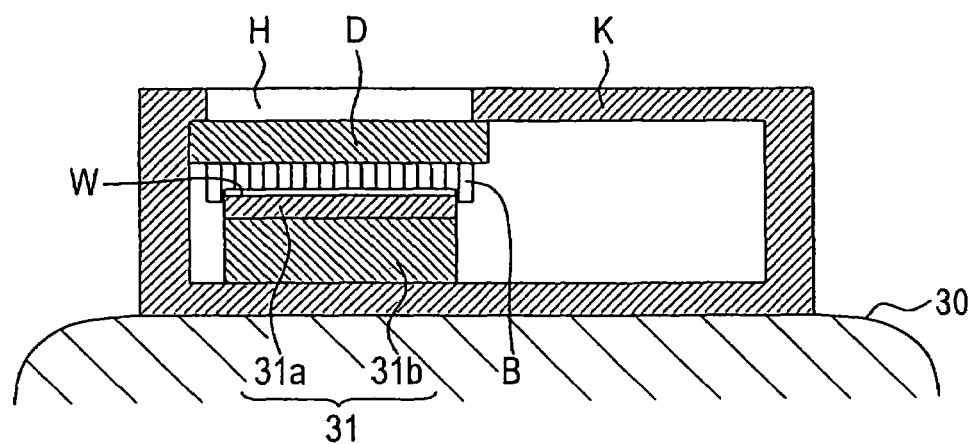
Figure 3A:
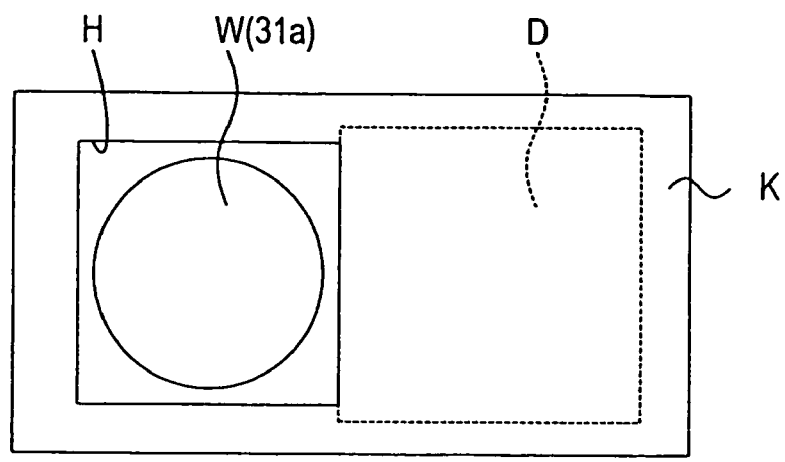
FIGS. 3A and 3B are a plan view and a sectional view showing the biometric sensor in its window-opening condition.
Figure 3B:
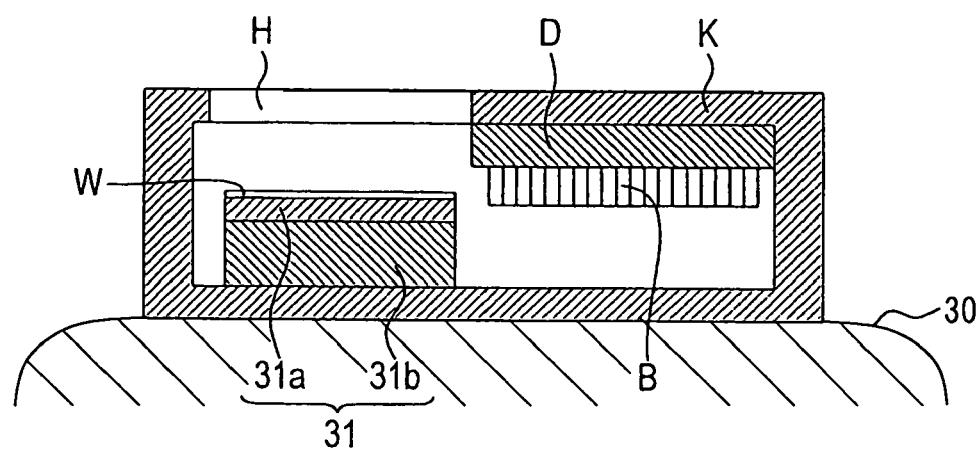

A shutter D is movably provided above the inlet opening W to normally close the opening H as shown in FIGS. 2A and 2B. The shutter D slides to open the opening H as shown in FIGS. 3A and 3B, when electrically driven by the driver circuit 33 for optical detection of the biometric information of the user. A cleaning brush B may be attached to the underside of the shutter D to clean the inlet opening W during sliding over the inlet opening W. The biometric sensor 31 is attached on a door handle 30 of the vehicle door so that the user may put his/her predetermined finger top part on the inlet opening W with ease.

When the user touches the inlet opening W with his/her predetermined finger top part under the condition that the opening H is held open as shown in FIGS. 3A and 3B, the sensing part 31a takes the picture image of the finger top part. The image processing part 31b extracts the finger print or other finger characteristics as the biometric information from the picture image. The brush D cleans the inlet opening W each time the shutter D is moved from and to the opening H, that is, before and after the user puts his/her finger on the inlet opening W.

The portable device 1 has a transmitter/receiver 11 for transmitting and receiving data with the control device 5 and a memory 13 for storing various data including an ID code as the identification information of the portable device 1. The transmitter/receiver 11 becomes operable in response to an interrogatory signal from the control device 5 and responsively transmits a response signal including the ID code stored in the memory 13.

The control device 5 has a transmitter 51 for transmitting an interrogatory signal to the portable device 1, a receiver 53 for receiving the response signal from the portable device 1 and a control ECU 55 for controlling the transmitter 51 and the sensor device 3. The control ECU 55 is also for controlling the door ECU 7 and the engine ECU 9 based on the ID code from the portable device 1 and the biometric information from the sensor device 3.

The transmitter 51 is provided for each seat-side door and a rear luggage door of the vehicle. The transmitter 51 transmits the interrogatory signal of a predetermined power level so that the portable device 1 may catch the interrogatory signal when entering a communication area, which is within a predetermined distance from each door.

The receiver 53 is attached to a rear view mirror, which is provided at the front side of a vehicle compartment. The receiver 53 receives the response signal from the portable device 1 and demodulates the ID code specific to each portable device. The radio communication between the portable device 1 and the control device 5 uses an electromagnetic wave in the frequency band of kHz to MHz.

The control ECU 55 includes a microcomputer (CPU, ROM, RAM, etc.), which stores various data including a pre-registered ID code as identification information (first registration information) specifically assigned to one or a plurality of authorized portable devices and pre-registered biometric information (second registration information) of one or a plurality of authorized users.

The ECU 55, particularly its microcomputer, is programmed to execute various control processing including door control (entry control) processing. The door control processing is started after the vehicle is parked, all the doors are locked and the portable device 1 is not within the communication area of the control device 5. This door control processing is shown in FIG. 4.

Figure 4:
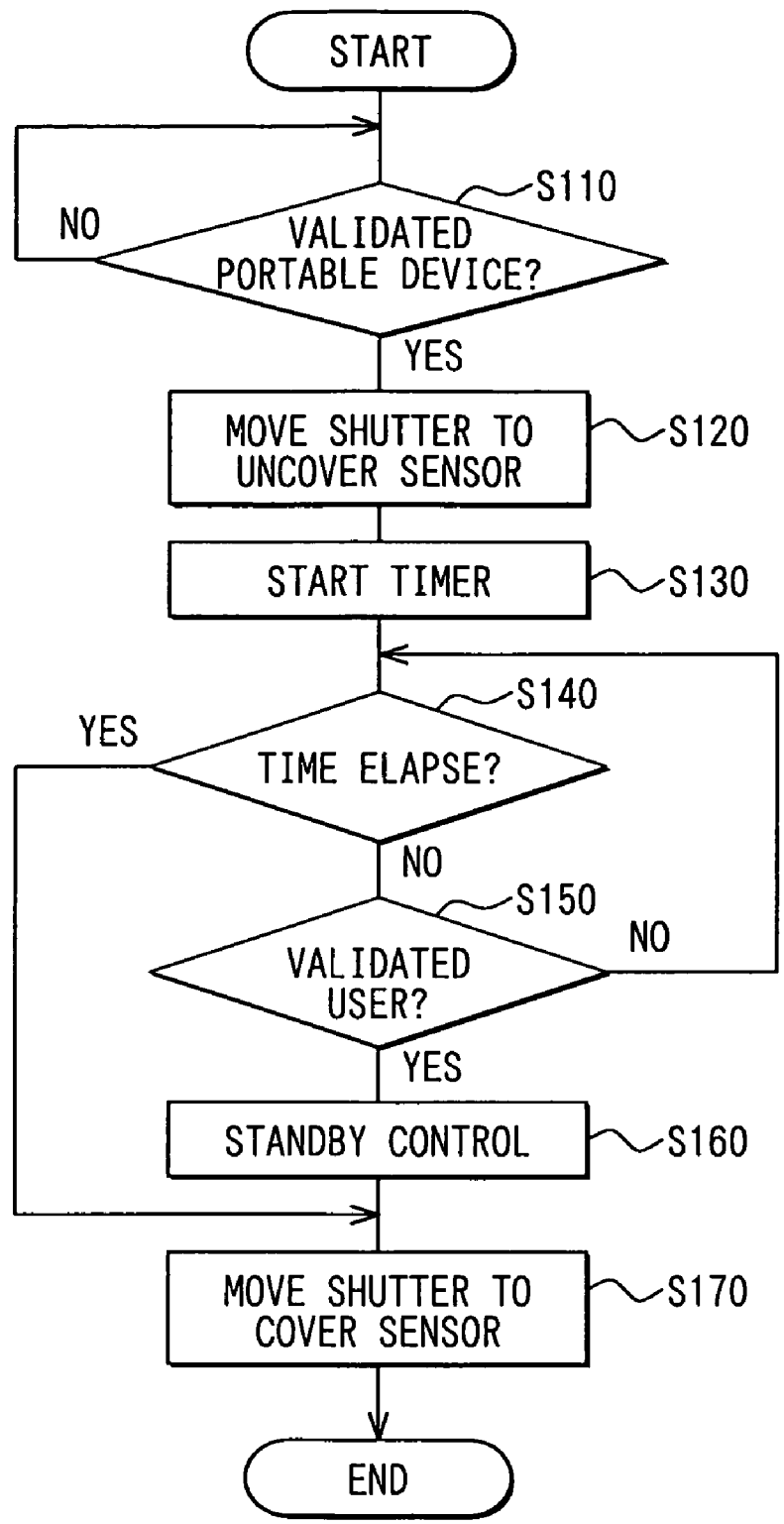
FIG. 4 is a flow chart showing processing of an electronic processing unit used in the control system shown in FIG. 1.

Referring to FIG. 4, the ECU 55 first checks at S110 whether the portable device 1 is validated (smart validation) by comparing the ID code included in the response signal from the portable device 1 entering the communication area with the first registration information. If the portable device 1 is validated, the ECU 55 executes biometric information detecting process at S120. In this step, the ECU 55 outputs a command to the driver circuit 33 to move the shutter D to expose or uncover the biometric sensor 31.

The ECU 55 then starts a timer at S130, and checks at S140 whether a predetermined wait time has elapsed. This wait time is set to ensure taking a picture image of a finger print of the user. If the wait time elapses, the ECU 55 terminates the biometric information detecting process at S170 by moving the shutter D to return to the normal position for covering the biometric sensor 31.

If the wait time has not elapsed yet, the ECU 55 checks at S150 whether the user is validated by comparing the biometric information from the biometric sensor 31 with the second registration information. If both information do not agree, that is, the user is not validated, S140 is repeated.

If both information agree, that is, the user is validated, the ECU 55 outputs the door unlocking permission command to the door ECU 7 at S160 so that each door may be held in the unlocking standby condition. The ECU 55 also outputs the engine starting permission command to the engine ECU 9 at S160 so that the engine may be held in the starting standby condition. After S160, the ECU 55 moves the shutter D to cover the biometric sensor 31 again at S170.

As described above, the shutter D is moved to expose the light inlet window W to the outside and enable the biometric information detection by the biometric sensor 31 only after the portable device 1 having the same ID code stored in the control device 5 enters the communication area. If the user touches the inlet opening W with his/her finger top within the wait time, the biometric sensor 31 takes the finger print picture as the biometric information. The user is validated by comparing this biometric information with the second registration information.

If both portable device and user are validated, the door and the engine may be ready to be opened and started by just touching respective switches without using a mechanical key.

According to the above embodiment, a predetermined vehicle control such as a door unlocking control or an engine starting control is attained only when both the portable device 1 and the user are validated based on the ID code and the biometric information, respectively. As a result, any unauthorized user whose biometric information is not pre-registered will be restricted from unlocking the door and starting the engine.

Further, the light inlet opening W is normally closed by the shutter D, and is opened only when the portable device 1 is validated. In addition, the brush B attached to the shutter D cleans the inlet opening W each time it moves to open and close the inlet opening W. As a result, the inlet opening W is prevented from being stained or blurred with dust and is held cleaned, thus enabling accurately detecting the biometric information of the user.

The above embodiment may be modified in various ways.

For instance, as the biometric information of the user, a face picture image, a retina pattern, an intravenous pattern or the like may be used in place of or in addition to the finger print. As the sensing part 31a of the biometric sensor 31, an optical sensor which projects a light to a detection object and receives a reflected light may be used in place of the CCD camera. The biometric sensor 31 may be attached anywhere, which will be most suitable for biometric information detection. The biometric sensor 31 may be made operable in response to any other trigger such as touching the door handle 30 without validation of the portable device.

The shutter D need not have the brush B. In place of the brush B, any other cleaning device such as a cloth may be used. Instead of sliding the shutter D and the brush B, the sensing part 31a may be provided slidably or rotatably so that the light inlet opening W of the sensing part 31 is normally positioned away from the opening H and is moved to the underside of the opening H only when the biometric information detection is made.

In place of or in addition to permitting door unlocking and engine starting after validating the user based on the biometric information, any other vehicle controls such as disabling vehicle travel or activating an anti-theft device may be provided.

Still further, the control system may be applied to houses or buildings other than vehicles.

What is claimed is:

1. A smart entry system for a vehicle comprising:
communication means for radio communication with a portable device carried by a user of a vehicle;
first validation means for validating the portable device by comparing identification information of the portable device received by the communication means with pre-stored first registration information indicative of a specified portable device;
biometric information detection means having a light inlet opening for detecting biometric information of the user based on light including the biometric information and passing through the light inlet opening;
second validation means for validating the user by comparing the biometric information detected by the detection means with pre-stored second registration information indicative of a specified user;
vehicle control means for executing a predetermined vehicle control when both the portable device and the user are validated by the first validation means and the second validation means, respectively; and
exposure control means for exposing the light inlet opening to the light thereby to render the detection means operable, only when the portable device is validated by the first validation means, wherein:
the exposure control means includes a shutter provided slidably along a surface of the light inlet opening;
the shutter is moved to slide only after the portable device is validated by the first validation means; and
the shutter includes a cleaning member for cleaning the surface of the light inlet opening when the shutter slides.

2. The smart entry system according to claim 1, wherein the biometric information detection means includes an imaging device for imaging a part of a body of the user through the light inlet opening.

3. The smart entry system according to claim 1, wherein the biometric information detection means includes an optical sensor for detecting the biometric information from changes in signal level of light reflected by the body of the user.

4. The smart entry system according to claim 1, wherein the biometric information detection means includes:
a sensing part using a CCD camera for imaging a part of a body of the user through the light inlet opening; and
a processing part for processing an image of the part of the body imaged by the CCD camera to extracting the biometric information from the image.

5. The smart entry system according to claim 4, wherein the biometric information detection means further includes:
a casing having a case opening larger than the light inlet opening and encasing the exposure control means and the sensing part underside of the case opening, wherein the exposure control means is slidable along the light inlet opening.

6. The smart entry system according to claim 1, further comprising: timer means for limiting exposure of the light inlet opening to a predetermined period after the portable device is validated by the first validation means.

7. A method for controlling entry of a user through a door, the method comprising:
holding normally a biometric device disabled to be exposed to light so that the biometric device is protected from being stained;
detecting whether the user approaches the door;
enabling the biometric device to be exposed to the light thereby to detect biometric information of the user by the biometric device in response to a detection of approach of the user;
enabling the user to open the door only when the user is validated based on the biometric information detected by the biometric device;
disabling again the biometric device to be exposed to the light;
causing a relative movement between the biometric device and a cleaner device each time the biometric device is driven to be enabled and disabled to be exposed to the light; and
cleaning the biometric device by the cleaner device during the relative movement.

8. The method according to claim 7 further comprising: limiting exposure of the biometric device to the light to a predetermined period.

* * * * *